Figure 2:
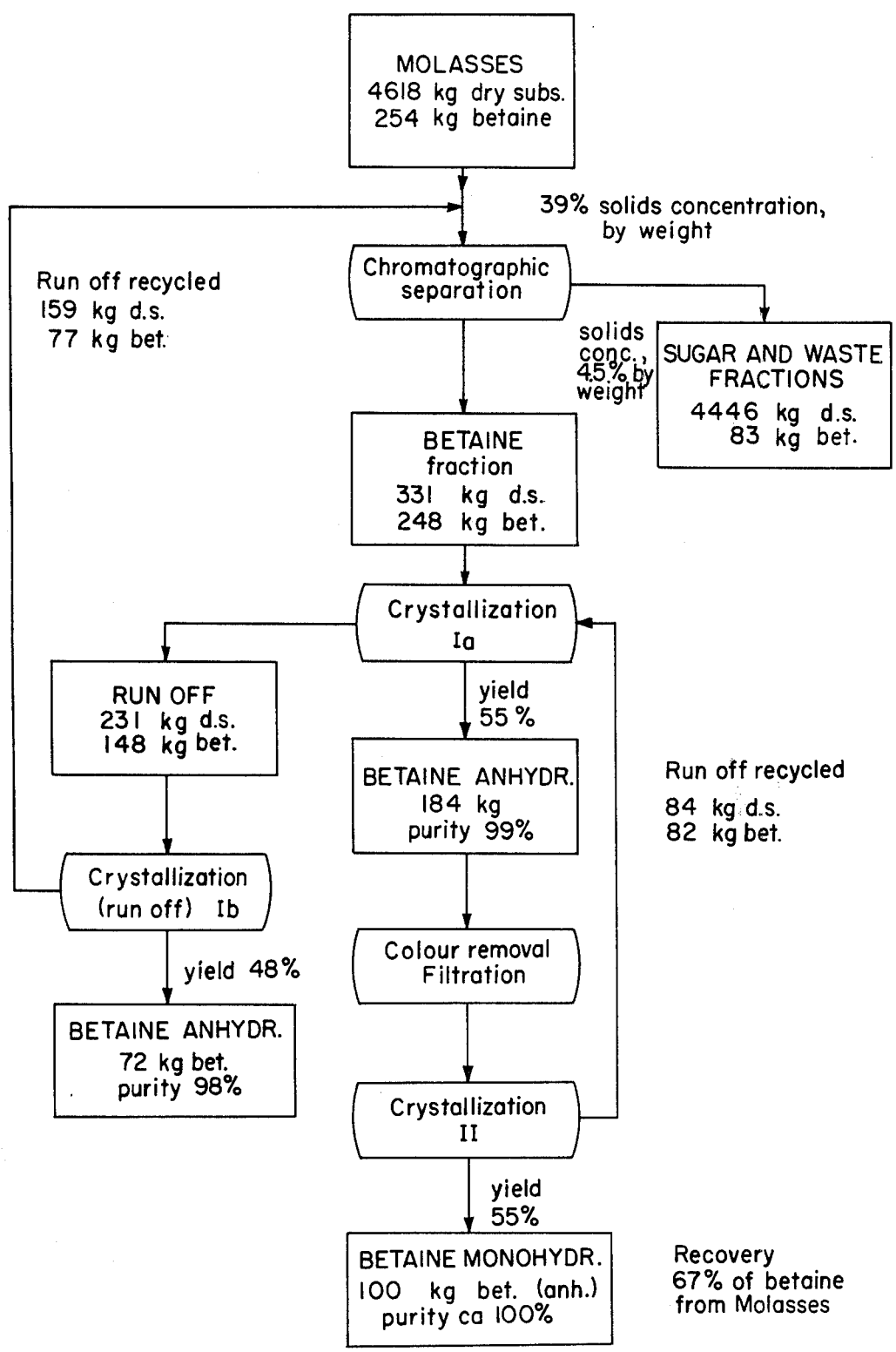

United States Patent [19]

Heikkilä et al.

[11] 4,359,430

[45] Nov. 16, 1982

[54] BETAINE RECOVERY PROCESS

[75] Inventors: Heikki O. Heikkilä; Jaakko A. Melaja; Dan E. D. Millner, all of Kantvik; Jouko J. Virtanen, Kirkkonummi, all of Finland

[73] Assignee: Suomen Sokeri Osakeyhtio, Espoo, Finland

[21] Appl. No.: 237,649

[22] Filed: Feb. 24, 1981

Related U.S. Application Data

[63] Continuation-in-part of Ser. No. 125,991, Feb. 29, 1980, abandoned.

[51] Int. Cl.$^3$ ............................................. C07C 101/12
[52] U.S. Cl. .................................. 260/501.13; 127/53
[58] Field of Search .................................... 260/501.13

[56] References Cited

U.S. PATENT DOCUMENTS

| | | |
|---|---|---|
| 2,519,573 | 8/1950 | Hoglan. |
| 2,586,295 | 2/1952 | Brown et al. |
| 2,868,677 | 1/1959 | Kopke. |
| 2,937,959 | 5/1960 | Reents et al. |
| 3,214,293 | 10/1965 | Mountfort. |
| 3,814,253 | 6/1974 | Forsberg. |
| 3,826,905 | 7/1974 | Valkama et al. |
| 3,884,714 | 5/1975 | Schneider et al. |
| 3,928,193 | 12/1975 | Melaja et al. |

FOREIGN PATENT DOCUMENTS 754511 3/1967 Canada.
715774 9/1954 United Kingdom.

OTHER PUBLICATIONS

D. Gross in CITS 14th Gen. Ass. Brussels 1971.
J. P. Dubois, On the Utilization of Betaine from Sugar Beets, Raffinerie Tirlementoise, s.a., D-3300 Tienan (Belgium).

*Primary Examiner*—G. T. Breitenstein
*Attorney, Agent, or Firm*—Brumbaugh, Graves, Donohue & Raymond

[57] ABSTRACT

Betaine is recovered from natural sources such as beet molasses, rest molasses and vinasse by diluting the molasses to 25-50% solids, introducing the molasses to the top of a chromatographic column containing a salt of a polystyrene sulfonate cation exchange resin cross-coupled with from about 2 to about 12 weight percent of divinylbenzene, eluting with water and collecting a fraction of betaine from the downstream side of the resin. When successive feeds with predetermined intervals are made, the feeds may be partly overlapped. The betaine from the preceding feed is then eluted by the dilute molasses from the following feed. The betaine fraction is evaporated under vacuum and the betaine crystallized as anhydrous crystals or as betaine monohydrate.

15 Claims, 12 Drawing Figures

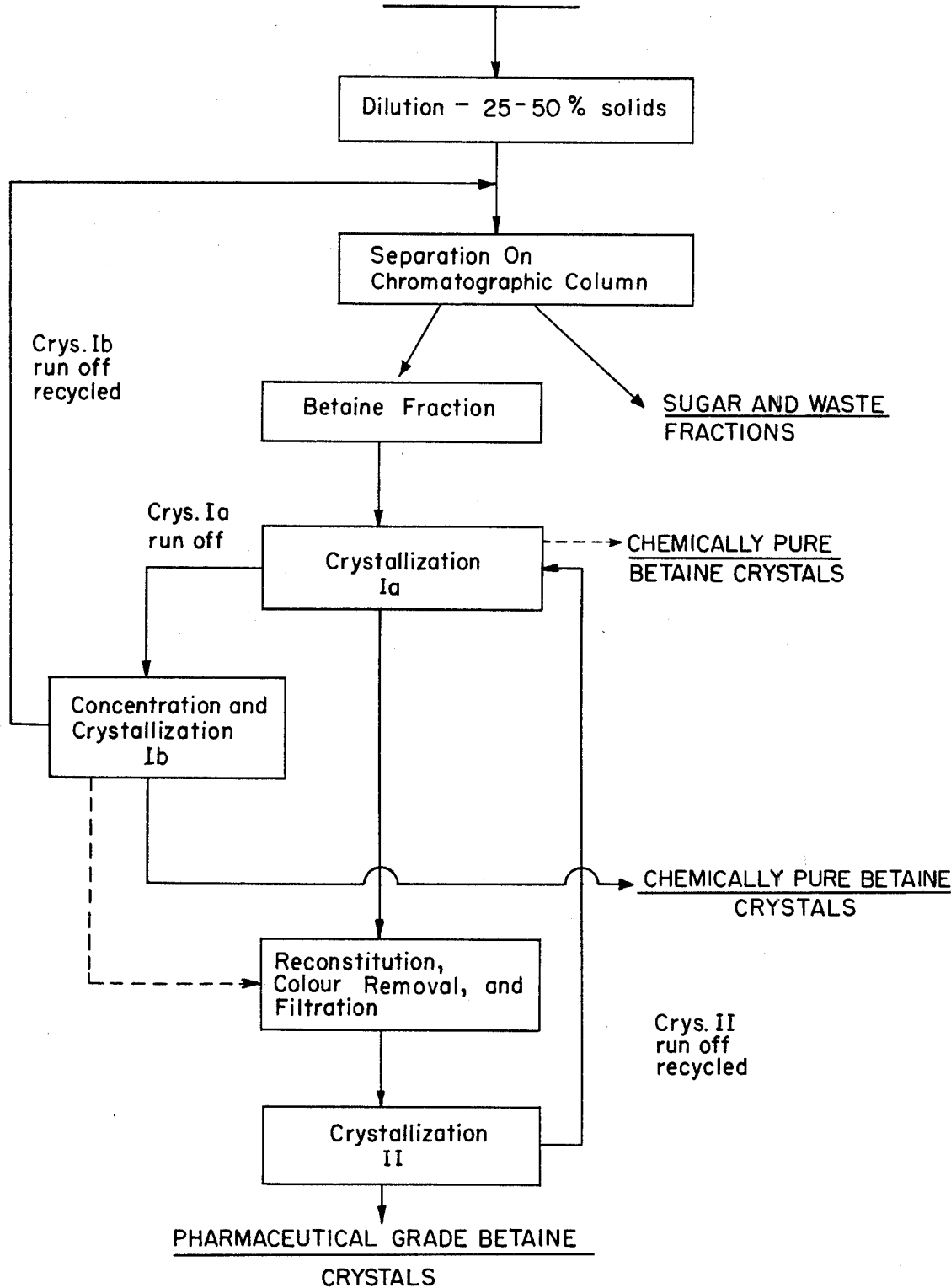

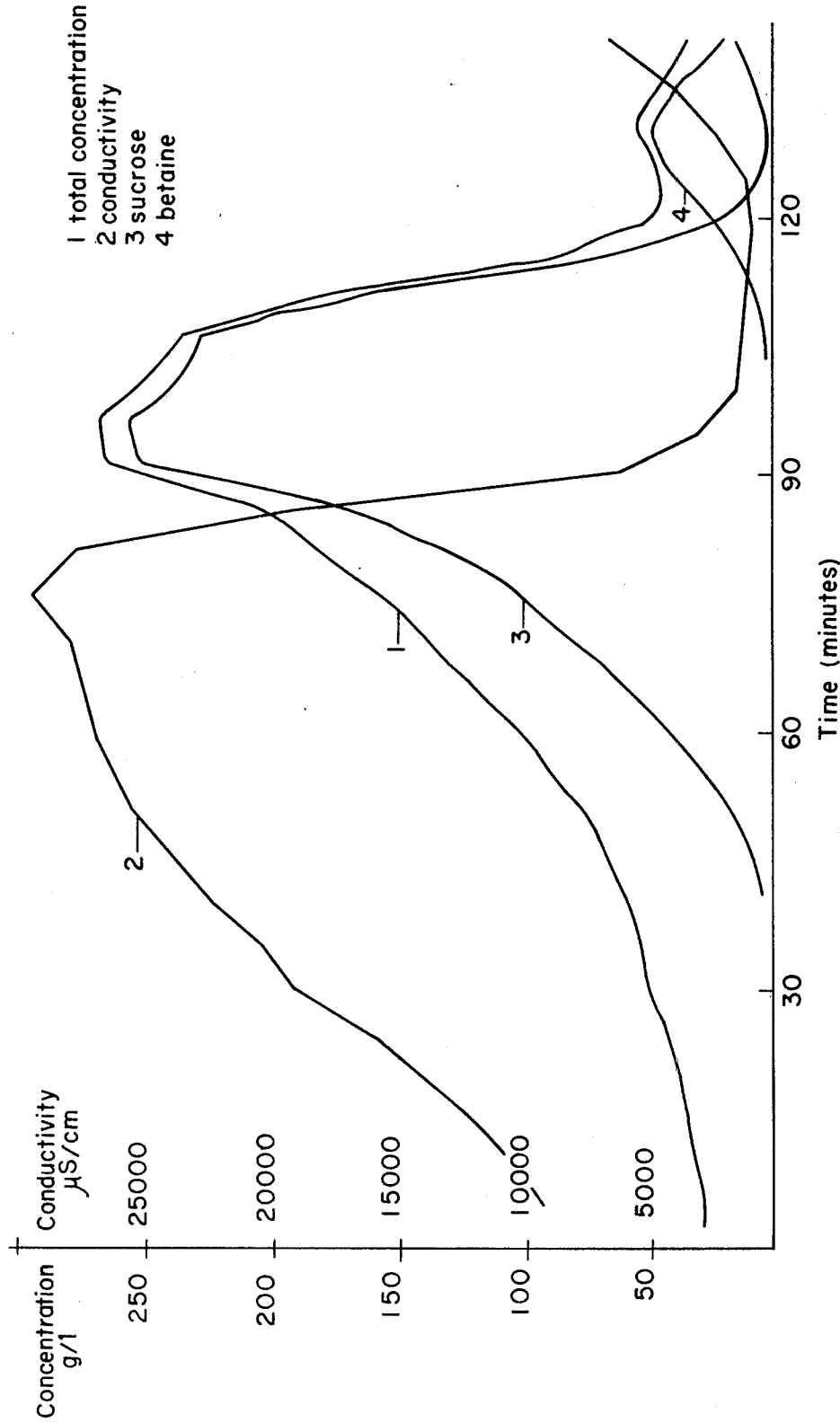

Material balance for betaine production from beet molasses

Material balance for the production of crystalline betaine

VINASSE SEPARATION

Betaine Production 2 Separations

Yield 84.7% from Molasses

STEP II. BETAINE SEPARATION

FLOW CHART – BETAINE PRODUCTION FROM INVERTED MOLASSES

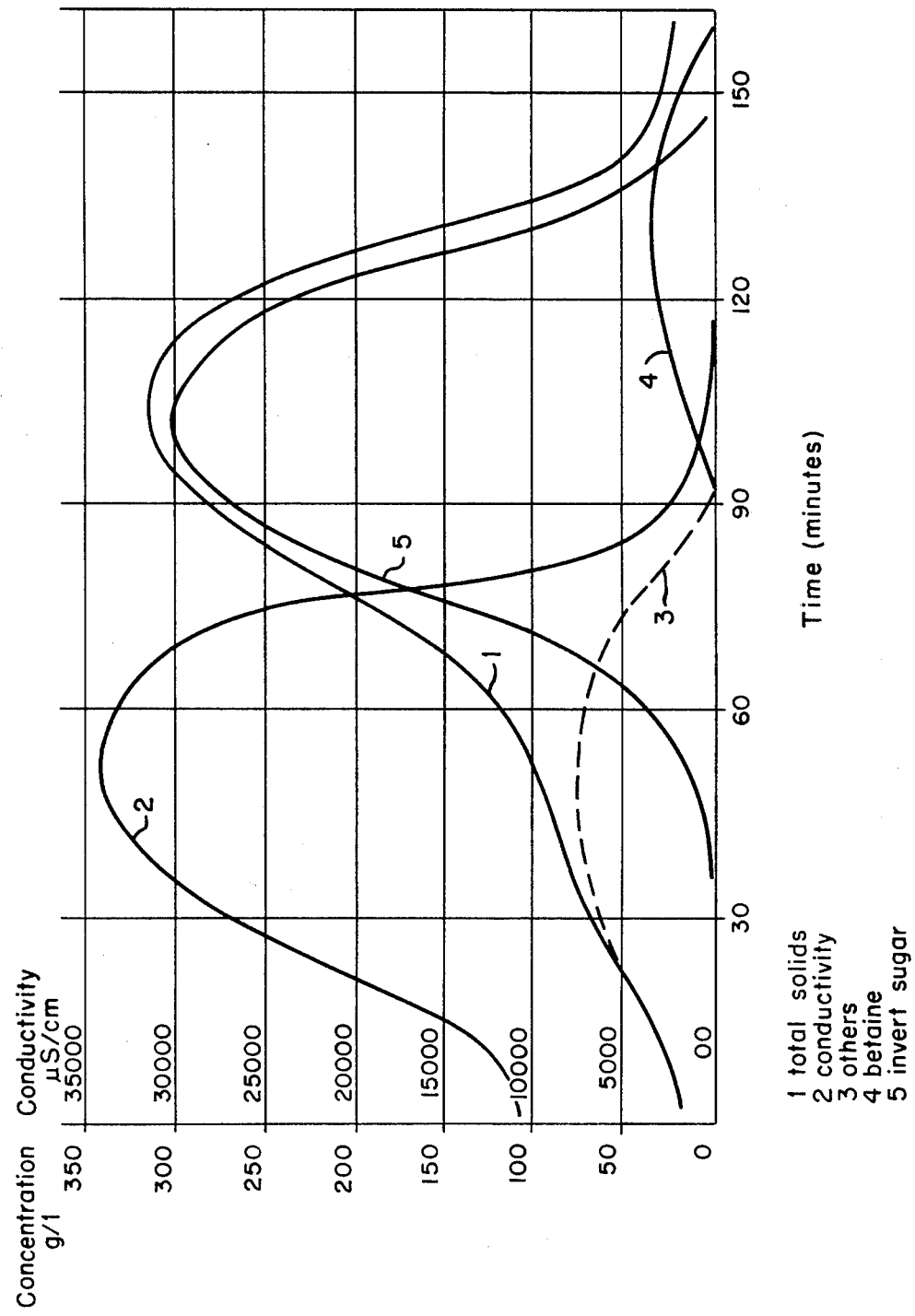

BETAINE RECOVERY PROCESS

This application is a continuation-in-part of co-pending Ser. No. 125,991, filed Feb. 29, 1980, which is now abandoned.

Betaine, an important component of beet molasses, has the molecular formula of:

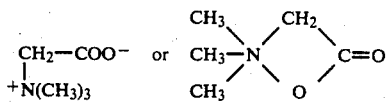

The compound is amphoteric and shows a neutral reaction in water solution. Betaine is readily soluble in water, and is utilized in animal feeds, including feeds for cattle, pigs and birds. In addition, betaine has pharmaceutical applications.

Betaine occurs in roots, grains, and stems of a variety of plants, and the sugar beet has a relatively high content thereof, ranging from 1.0 to 1.5% on a dry solids basis. During processing of the sugar beet to recover sucrose, betaine concentrates in the molasses. Beet molasses normally contains between 3 and 8 percent on a dry solids basis of betaine. Other materials have substantial amounts of betaine include rest molasses from the Steffen process, vinasse, and some run off syrups that are the by-products of sugar refining.

PRIOR ART

From beet molasses, betaine has been recovered by ion exchange, by crystallization as hydrochloride, or by extraction into organic solvents.

Several modifications of the ion exchange process have been published; see, for example, U.S. Pat. No. 2,586,295, Japanese Pat. No. 24904/71, U.S.S.R. Pat. No. 445,270, and Schneider F.: Technologie des Zuckers, Verlag Schaper Hannover, 1968, p. 635-636. These prior art methods generally comprise passing molasses through a strong cation exchanger, rinsing the exchanger free from residual solution, and desorbing the betaine by passing a diluted ammonia solution through the resin bed.

If beet molasses is subjected to a desugarization process, i.e. the Steffen process, the betaine concentrates into the rest molasses. A similar raw material for betaine is vinasse, which is residual molasses from a fermentation process.

Betaine has been recovered from rest molasses or vinasse by ion exchange, but due to the comparatively high concentration of betaine in these materials, it is also possible to utilize the low solubility of betaine hydrochloric acid; see British Pat. No. 715,774, U.S. Pat. No. 2,519,573, Schneider F.: Technologie des Zuckers, Verlag Schaper, Hannover, 1968, p. 1010.

From rest molasses, betaine has also been recovered by extraction into organic solvents; see German Patent Appln. No. 2,300,492.

Chromatographic methods for the separation of organic compounds are well-known from analytical chemistry. A type of chromatography, the so-called "ion exclusion" chromatography, has been used for the recovery of sucrose from molasses. A great number of patents and other publications on this method can be found in the literature, i.e. D. Gross in CITS 14th Gen. Ass. Brussels 1971, U.S. Pat. Nos. 2,868,677; 2,937,959; 3,214,293; and 3,884,714; and Canadian Pat. No. 754,511. In the ion exclusion process, molasses is usually separated on a cation exchange resin column in alkali metal form. The sugar fraction is eluted from the column after the nonsugar fraction.

STATEMENT OF INVENTION

It has now been found that betaine can be separated from the sugars and nonsugars of beet molasses by a chromatographic process. Dilute molasses is supplied to a chromatographic column. On elution of the dilute molasses from the column with water, there is recovered, as eluate leaving the bottom of the column, a first, nonsugar waste fraction, a second fraction containing a substantial proportion of the sugars in the feed, and a third betaine fraction, which is eluted at the tail end after the sugar fraction, and which contains a high proportion of the betaine in the feed, as much as 80% or more on dry substance. From the said betaine fraction, betaine can be recovered by crystallization, or may be recovered as the hydrochloride, if desired.

A suitable raw material for betaine production is sugar beet molasses, which normally contains 3-8% of betaine on a dry solids basis. Both rest molasses from a desugarization process and vinasse from a fermentation process are high in betaine and are naturally also very suitable raw materials.

Betaine hydrochloride, which is used in pharmaceutical preparations, for example, can be prepared from the betaine-rich fraction obtained by the process of the present invention by a conventional process using an equivalent amount of hydrochloric acid.

A flow chart giving a general description of the process of the present invention is shown in FIG. 1 of the drawings. Referring to FIG. 1 and in accordance with the process of the present invention, molasses containing betaine is diluted to a solids content of about 25-50%, preferably 35-40%, and fed to a large scale chromatographic column. The column contains a strong cation exchange resin in alkali metal form; sodium is generally the preferred alkali metal as being more economical. The column of resin is covered with water prior to feeding the diluted molasses thereto. On completion of the molasses feed step, the column is eluted with water at 60°-90° C. and the eluate is collected as several fractions.

The resin used in the column is preferably an alkali metal salt of a sulphonated polystyrene exchange resin crosslinked with from about 2 to about 12 weight percent, and more preferably, from about 3 to about 9 weight percent divinylbenzene (DVB). The resin is of uniform particle size and has a mean bead diameter preferably within the range of about 20 to 400 U.S. mesh, and most preferably in the approximate range of 0.2-0.5 mm. The height of the resin bed is from about 2.5 to about 10 meters. The feed rate is 0.5-2 cubic meters per hour per square meters of the cross sectional area of the resin column ($m^3/h/m^2$). The feed is preferably a betaine-containing beet molasses, a rest molasses, or vinasse, which is diluted with water to contain about 25-50 weight percent dry substance, preferably about 35-40%.

On elution with water, there is recovered from the column as eluate, a first nonsugar waste fraction, a second sugar-containing fraction, and a third fraction consisting principally of betaine. The nonsugar and sugar fractions are subjected to further treatment to recover sugar and rest molasses. These further treatment processes are previously described in the literature and are not part of this invention.

Where feed solutions having a relatively low sugar level are used, the second, sugar-containing fraction may not contain commercially significant quantities of sugar. In that case, the fraction may be used as a cattle food, or a portion or all of it may be returned to the system with the next feed. Further, it has been found that successive feeds of dilute molasses with predetermined feeding intervals followed by elution with water, may be accomplished. When this is done, it is possible, if desired, to partly overlap the feeds. Thus, the betaine fraction on the column from the preceding feed is eluted using the dilute molasses from the following feed as eluate. In this case, the last fraction of the first feed contains the betaine from the first feed, together with a small portion of the other ingredients of the second feed. An advantage of this procedure is that because of the shorter time between feeds, the total processing time for a given quantity of molasses is substantially reduced.

Another feed solution which may be used according to this invention is a molasses which has been treated to cause inversion of the sucrose content. This may be desirable, for example, where recovery of betaine is to be part of a process where "liquid sugar" is produced from the molasses, as described in the publication by Hongisto, H. and Heikkilä, H.: Desugarization of cane molasses by the Finnsugar process. In: Proceedings XVI Congress of International Society of Cane Sugar Technologists, Sao Paulo 1977, Vol. 3, Pages 3031–3038). Thus, it may be desirable to invert the sugar content of beet molasses, using conventional acid or enzymic treatments, prior to recovering betaine therefrom, according to the process of this invention. Thus, the term molasses as used herein and in the appended claims includes invert molasses as well as conventional molasses.

Betaine is recovered from the fraction consisting principally of betaine termed "Betaine Fraction" in FIG. 1, by first evaporating it to from about 77% to about 81%, preferably about 80% dry substance concentration. The solution is then seeded with anhydrous betaine crystals and anhydrous betaine is crystallized by maintaining the temperature at 75°–85° C., under a vacuum within the range of about 80–120 millibar during the crystallization. A conventional vacuum crystallizer, i.e. of the type used in the sugar industry, is suitable for carrying out this step of the process. The water is evaporated, causing the crystals to grow. When crystallization is substantially complete, as represented by Crystallization Ia in FIG. 1, the anhydrous betaine crystals are separated from the mother solution by centrifugation. The run off syrup from the centrifugation is concentrated to 80–90% solids, seeded with anhydrous betaine crystals, and an additional amount of anhydrous betaine crystals is recovered by crystallization in a vacuum crystallizer, as shown at Crystallization Ib in FIG. 1. In the second crystallization, Ib, the temperature is maintained at 80°–90° C. under a vacuum within the range of about 60–100 millibar.

The crystallization time in the first crystallization, Ia, is 4–10 hours, while in the second, about 6–12 hours are required. The yields are 50–55% of betaine from the first crystallization and 45–50% of betaine from the second. The purity of the crystals is 99% in the first and 98% in the second crystallization. The first and second crystallization procedures just described as Crystallization Ia and Ib provide a product which may be described as a chemically pure betaine product.

Pharmaceutical grade betaine monohydrate can be recovered by dissolving in water the crude betaine crystals obtained in Crystallization Ia and Ib to form a solution having about 60% solids, subjecting the thus formed solution to color removal by conventional activated carbon/filtration treatment, and recrystallizing the betaine from water in a vacuum crystallizer at 75°–85° C., with a vacuum in the range of about 100–180 millibar. The crystallization time under these conditions ranges from 2–4 hours, the yield of betaine is 50–55%, based on the total betaine in the feed, and the purity of the crystals is over 99.8%. This stage of the process is represented in FIG. 1 as Crystallization II.

Figure 7:
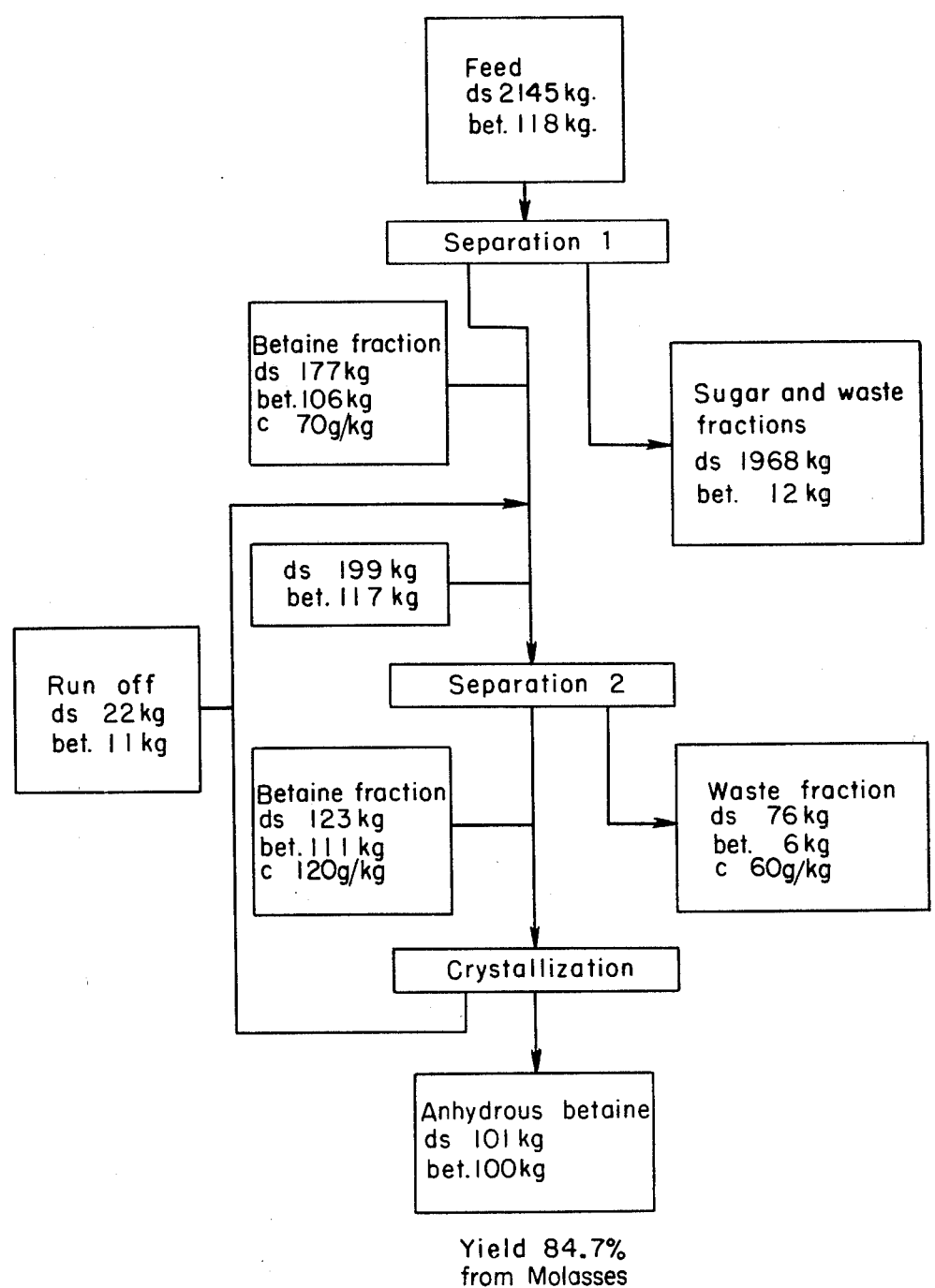

A different route of preparing pure betaine can also be followed. The betaine may be separated from the molasses by chromatographic separation in two steps: a crude separation in order to collect a betaine-rich fraction which is then separated a second time to recover a pure betaine solution. A material balance for the two-step separation process is shown in FIG. 7. The purity of the betaine solution which is recovered from the second separation step is 90%. From this solution betaine is crystallized. The process is described in detail in Examples 7–8.

In conducting the betaine recovery process of the present invention, recourse may be had to the use of equipment found in the prior art. The chromatographic column and process described in U.S. Pat. No. 3,928,193 as well as the feeding device for the column described in U.S. Pat. No. 3,814,253 may be used. Further, automatic control of the fractionation process based upon measurement of density and optical rotation of sucrose as described in U.S. Pat. No. 3,826,905 may be employed. Additional automatic measurements of process variables such as conductivity may be employed and microprocessors may be used to advantage in making automatic calculations and in carrying out control procedures. Crystallization of anhydrous betaine and of betaine monohydrate may be carried out in conventional vacuum crystallizers with forced circulation of the type used in sucrose production. The betaine crystals may be separated from their mother liquor in centrifuges such as the type normally used to separate sucrose crystals from molasses.

The invention will be further described with reference to the following working examples:

EXAMPLE 1

Recovery of betaine from beet molasses

Betaine was recovered from beet molasses by diluting the molasses and passing it to a chromatographic column, the process and column having the following characteristics:

Chromatographic Column: Sulphonated polystyrene-divinylbenzene cation exchange resin in Na$^+$-form. 5.5% DVB. Mean bead diameter 0.45 mm. Bed Height 6.1 m. and bed diameter 2.76 m. The bed was initially totally immersed in water.

Flow Rate: 0.977 m$^3$/h/m$^2$(=5.85 m$^3$/h)

Temperature: 82° C.

Eluent: Water

Feed: 1445 kg dry substance in the form of beet molasses, diluted with water to 39% dry substance.

| Composition of Solids | % on Dry Substance |
| --- | --- |
| Sucrose | 62.2 |
| Betaine | 6.9 |
| Other Solids | 30.9 |

Seven separate fractions were collected during the large scale chromatographic separation, as shown in FIG. 1a of the drawings and Table 1. The composition of the fractions is shown in Table 1 below. Fraction 2 is the waste fraction and is removed from the process for subsequent use as animal food, a fermentation substrate, or the like. Fraction 5 is the sugar fraction and Fraction 7 the betaine fraction. Fractions 1, 3, 4, and 6 are recycled to the process by combining them with the molasses feed stock for subsequent runs.

The recovered betaine fraction contained 72% of the betaine in the feed. The purity of the fraction was 80.6% on dry substance basis.

TABLE 1
COMPOSITION OF FRACTIONS
FROM BEET MOLASSES SEPARATION (Ex. 1)

| | Fraction | | | | | | |
| --- | --- | --- | --- | --- | --- | --- | --- |
| | 1 | 2 | 3 | 4 | 5 | 6 | 7 |
| Minutes | 0–17 | 17–65 | –72 | –80 | –115 | –120 | –140 |
| Total Solids Concentration g/100 g | 3.1 | 6.6 | 13.1 | 15.5 | 20.0 | 5.5 | 4.6 |
| Composition of Solids, Weight % on Dry Substance | | | | | | | |
| Sucrose | 1.1 | 20.1 | 55.0 | 64.6 | 92.0 | 58.3 | 5.6 |
| Betaine | 12.5 | 0.4 | 0 | 0 | 1.2 | 37.6 | 80.6 |
| Other | 86.4 | 79.5 | 45.0 | 35.4 | 6.8 | 4.1 | 13.8 |

Several successive feeds were made with water being introduced to the top of the column between each feed as eluent. The resin column was at all times covered with liquid. From each feed, the betaine, which is eluted last as Fraction 7, was recovered just before the nonsugars (other) fraction of the following feed. The time between feeds was 140 minutes.

EXAMPLE 2

Production of anhydrous betaine and betaine monohydrate

Anhydrous betaine and betaine monohydrate were recovered, and a material balance for the process is shown in FIG. 2. Beet molasses was separated by large scale chromatography as described in Example 1. The betaine yield in the separation was 75% of the betaine in the feed, and the purity of the solution was 75% on dry substance. Again following the process described in Example 1, successive feeds of the diluted molasses were made, separations performed, and the betaine fractions obtained thereby from the eluent of each succeeding feed were combined. Water was used as eluent, and 140 minutes elapsed between each feed. The dilute betaine solution thus obtained as the combined betaine fraction contained 4.5% dry substance by weight and was evaporated to 80 weight percent concentration. The concentrated solution thus obtained was seeded with betaine crystals and anhydrous betaine was crystallized, as at Ia in FIG. 2, at 75°–85° C. under a vacuum of about 100 millibar. The yield of betaine crystals was 55%. The purity of the crystals was 99%. The crystallization was carried out in a conventional sugar crystallizer with forced circulation. The crystallization time was 6 hours.

The crystals were separated from the mother liquor be centrifugation in a conventional sugar centrifuge. The run off syrup was evaporated, and by crystallization at 80°–90° C., Ib in FIG. 2, and at a vacuum of 60–100 millibar, an additional amount of betaine anhydride crystals was recovered. The yield for this crystallization step was 48% and the purity of the crystals 98%. The crystallization time was 8 hours. The run off syrup from the centrifugation of the crystals from this second crystallization, Ib, was recycled to the feed solution.

In order to produce pharmaceutical grade betaine monohydrate, the anhydrous betaine crystals obtained are dissolved in water to provide a 60% by weight solution of solids, and the solution was purified by treatment with activated carbon followed by filtration. From the purified solution, betaine monohydrate was crystallized at 80° C. in a sugar crystallizer, at Crystallization II. The yield was 55%, and the purity of the betaine crystals almost 100%. The run off syrup was recycled as feed for crystallization step Ia.

EXAMPLE 3

Production of crystalline betaine

Figure 3:
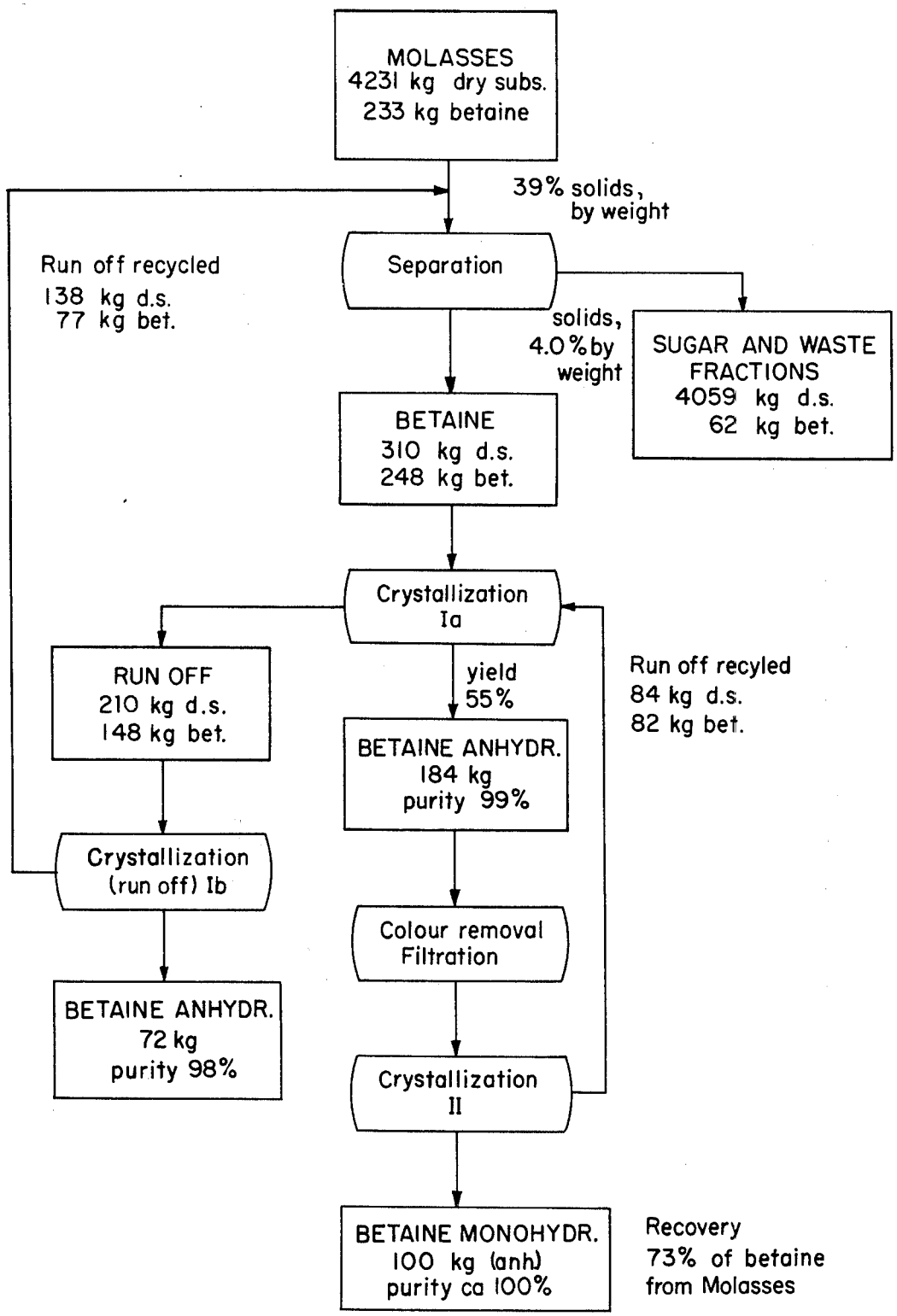

A material balance for the production of crystalline betaine is shown in FIG. 3.

Beet molasses was separated by large scale chromatography as in Examples 1 and 2. Successive feeds were made and the collected betaine fractions combined. The betaine yield in the fractionation was 80%, and the purity of the betaine solution was also 80% on dry substance. The concentration of the betaine solution was 4.0 weight percent. The dilute betaine solution was concentrated by evaporation to ca 80% solids, seeded, and anhydrous betaine was crystallized as in Example 2. The crude anhydrous betaine crystals were dissolved in water, and the solution subjected to conventional color removal and filtration. From the purified solution, betaine monohydrate was crystallized. The yield was 72 kg betaine anhydride and 100 kg betaine monohydrate (anhydrous basis).

EXAMPLE 4

Separation of desugarized rest molasses

Betaine was recovered from desugarized rest molasses by passing it through a chromatographic column having the characteristics and using the operating conditions set forth below:

Column: Sulphonated polystyrene-divinylbenzene cation exchange resin in Na$^+$-form. Mean bead diameter 0.42 mm. Bed height 5.4 m. Bed diameter 0.225 m.
Flow Rate: 0.04 m$^3$/h
Temperature: 85° C.

Feed: Desugarized rest molasses. Dry substance 12 kg as a 40 weight percent solution.

| Composition of Solids | % on Dry Substance |
|---|---|
| Sucrose | 32.4 |
| Betaine | 9.1 |
| Other Solids | 58.5 |

Eluent: Water

Figure 4:
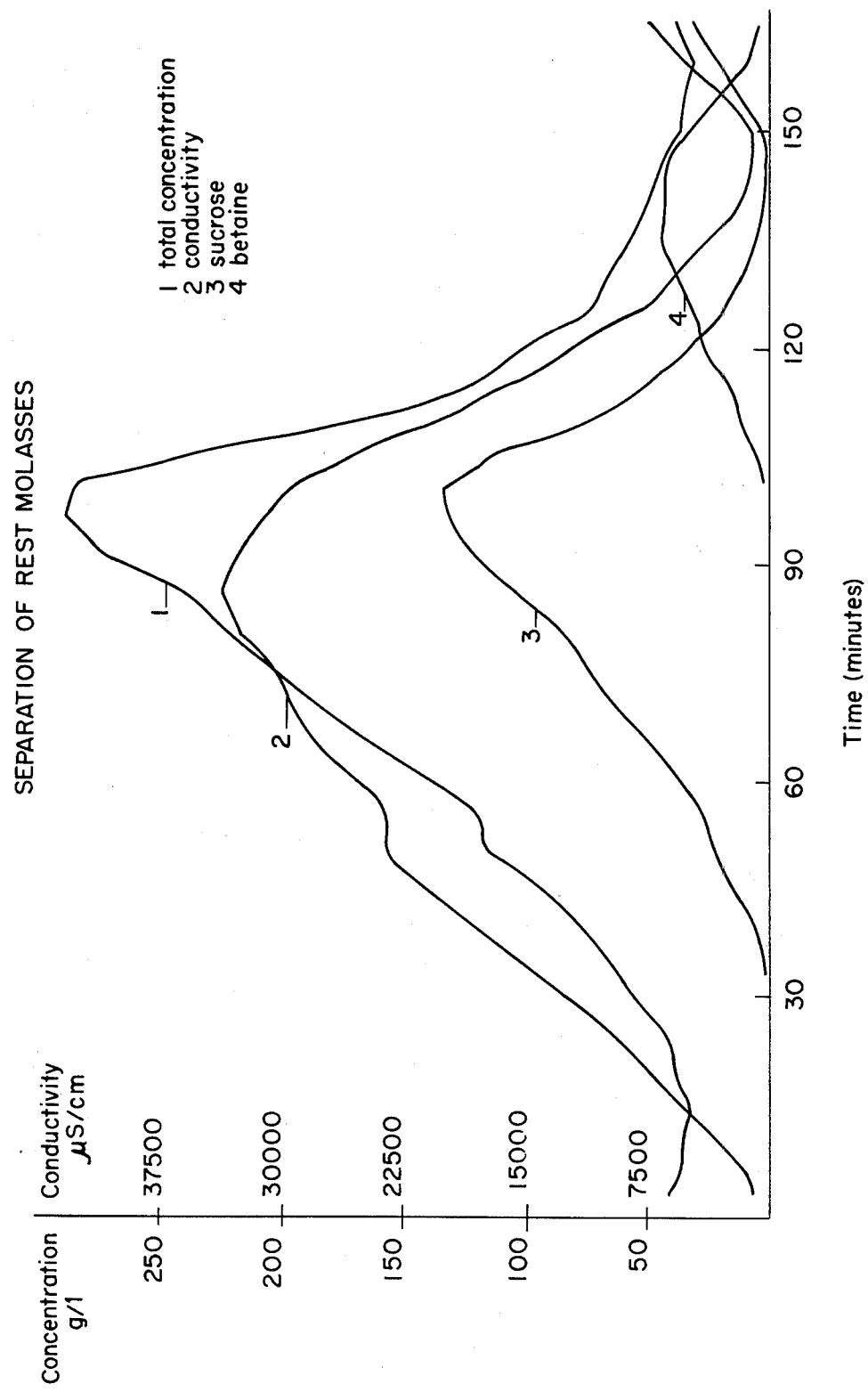

The result of the separation is shown in FIG. 4. The Figure shows the situation when successive feeds were made. The nonsugars (other) of the following feed are eluted right after the betaine of the preceding feed. The time between feeds was 145 minutes, and during this time, water was continuously supplied to the top of the column as an eluent and in an amount sufficient to maintain a liquid level above the resin in the column.

Table 2 below shows the composition of the collected 4 fractions. Fraction 1 is a waste fraction, Fraction 3 is the betaine fraction, and Fractions 2 and 4 are recycled to the process in order to increase the yield. Because of the relatively low level of sucrose in the feed, no sugar fraction was recovered.

TABLE 2
COMPOSITION OF FRACTIONS FROM
REST MOLASSES SEPARATION (Ex. 4)

| | Fraction | | | |
|---|---|---|---|---|
| | 1 | 2 | 3 | 4 |
| Minutes | 10–115 | –125 | –153 | –155 |
| Total Solids Concentration g/100 g | 14.1 | 9.0 | 5.1 | 3.5 |
| Composition of Solids, Weight % on Dry Substance | | | | |
| Sucrose | 34.6 | 33.5 | 8.8 | 0 |
| Betaine | 1.5 | 29.7 | 76.0 | 60.1 |
| Other | 63.9 | 36.8 | 15.2 | 39.9 |

EXAMPLE 5

Separation of beet molasses

Beet molasses was diluted to 39.6% dry solids content and introduced at the top of a chromatographic column of the following characteristics and under the following conditions:

Column: Sulphonated polystyrene-divinylbenzene cation exchange resin in $Na^+$-form. 6.5% DVB. Mean bead diameter 0.44 mm. Bed height 4.4 m. Bed diameter 60 cm.
Temperature: 81.5° C.
Flow Rate: 0.246 $m^3$/h
Feed: Beet molasses, 64 kg dry substance as a 39.6% water solution.

| Composition of Solids | % on Dry Substance |
|---|---|
| Sucrose | 66.5 |
| Betaine | 5.3 |
| Other Solids | 28.2 |

Eluent: Water

Figure 5:
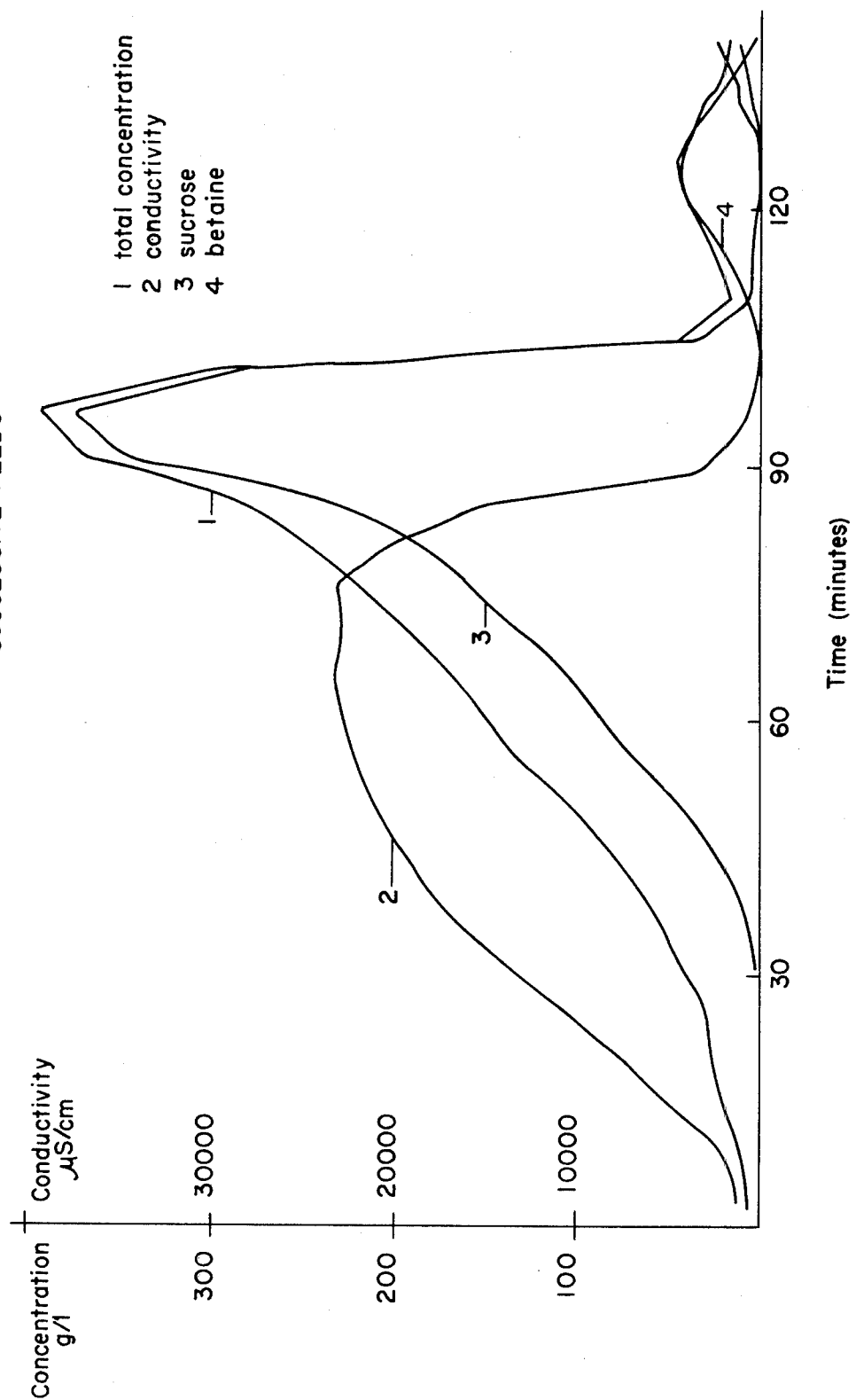

The fractionation is shown in FIG. 5. When successive feeds were made, the nonsugars of the following feed were eluted just after the betaine of the preceding feed. The time between feeds was 130 minutes. Water was used as eluent between feeds, and the liquid level was maintained at all times above the resin level in the column.

Table 3 below shows the distribution of components into the 4 collected fractions. Fraction 1 is the waste or "rest molasses" fraction, Fraction 2 is recycled, Fraction 3 is the sugar fraction, and Fraction 4 the betaine fraction.

TABLE 3
COMPOSITION OF FRACTIONS FROM
BEET MOLASSES SEPARATION (Ex. 5)

| | Fraction | | | |
|---|---|---|---|---|
| | 1 | 2 | 3 | 4 |
| Minutes | 5–60 | 60–80 | –105 | –135 |
| Total Solids Concentration g/100 g | 6.1 | 18.7 | 26.1 | 3.2 |
| Composition of Solids, Weight % on Dry Substance | | | | |
| Sucrose | 30.4 | 67.4 | 90.9 | 8.9 |
| Betaine | 1.1 | 0 | 0 | 81.3 |
| Other | 68.5 | 32.6 | 9.1 | 9.8 |

EXAMPLE 6

Vinasse separation

Betaine was recovered from vinasse by chromatographic separation followed by crystallization. Vinasse is a fermentation by-product which contains high amounts of betaine. The separation was carried out on a bench scale column. The conditions were:

Feed: 0.1 liter diluted vinasse. concentration (c) 30 g/100 g
Flow Rate: 360 ml/h
Resin: Zerolit 225, Na-form, 3.5% DVB
Column Height: 0.83 m
Particle Size: 0.23 mm
Temperature: 60° C.
Column Diameter: 4.4 cm

| Composition of Feed | % on Dry Substance |
|---|---|
| Monosaccharides | 10.1 |
| Oligosaccharides | 4.8 |
| Betaine | 14.0 |
| Others | 71.1 |

The time between two successive feeds was 135 minutes. Water was used as the eluent between feeds. From the eluent, fractions were collected as shown in the following Table 4:

TABLE 4
COMPOSITION
OF FRACTIONS FROM VINASSE SEPARATION (Ex. 6)

| | Fractions | | | |
|---|---|---|---|---|
| | 1 | 2 | 3 | 4 |
| Minutes | 0–10.0 | 10.0–117.5 | –120 | –135 |
| Total Solids Concentration g/100 g | 1.7 | 4.0 | 5.5 | 3.5 |
| Composition of the Fractions % | | | | |
| Monosaccharides | 8.6 | 8.9 | 29.9 | 15.5 |
| Betaine | 42.4 | 3.9 | 62.8 | 75.5 |
| Oligosaccharides and Others | 49.0 | 87.2 | 7.3 | 9.0 |

Figure 6:
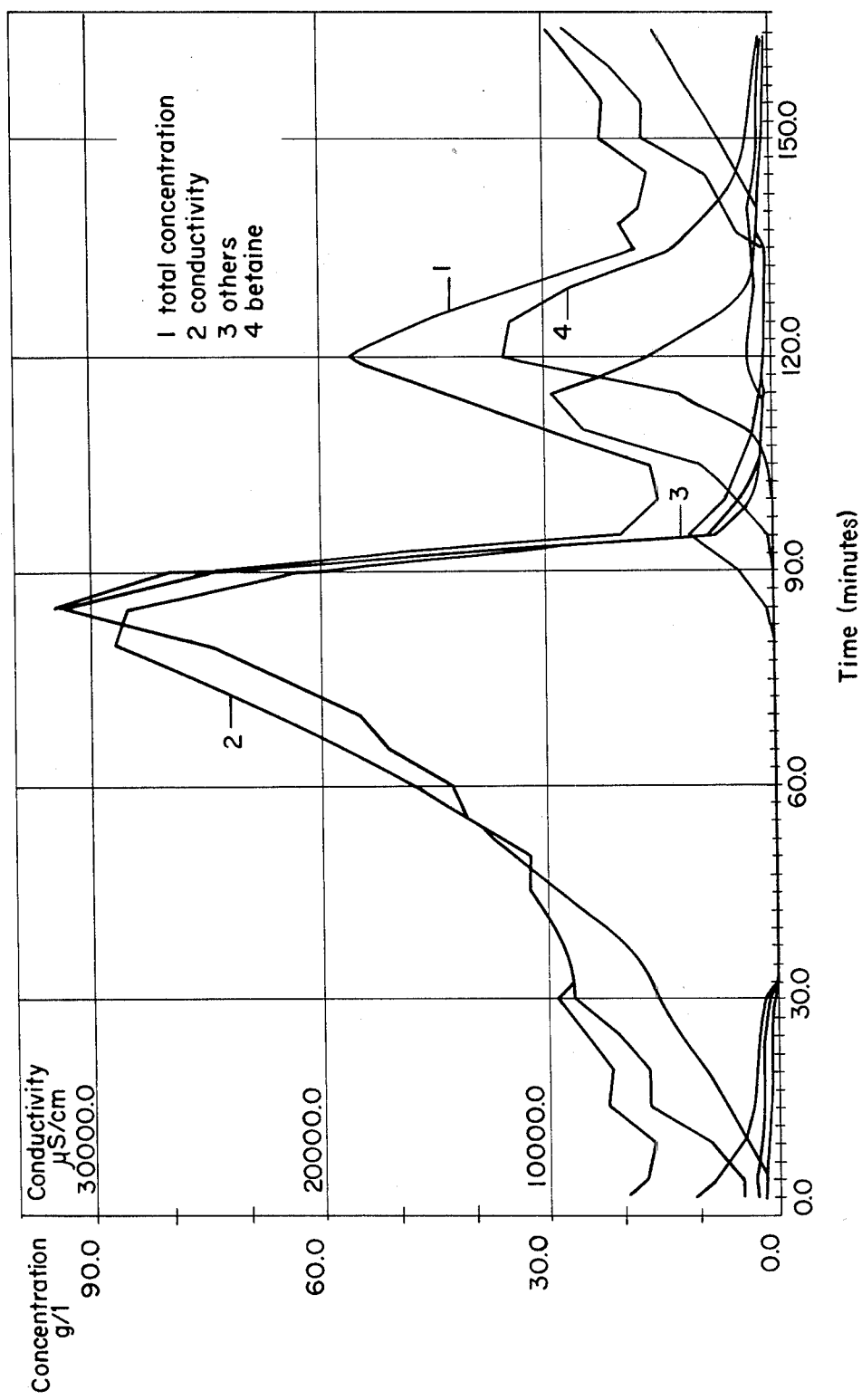

The feed capacity was 10.4 kg ds/h/$m^3$ resin. The separation is shown graphically in FIG. 6. From the betaine fraction (Fraction 4), betaine was recovered by crystallization as in Examples 2 and 3. The total yield was increased by recirculations, as in Example 1, to over 80% of the betaine in the feed.

EXAMPLE 7

Betaine production, two separations

Betaine was prepared from beet molasses by separation in two steps: a crude separation to increase the betaine amount in the solution and a second separation to recover a pure betaine solution. The chromatographic separations were carried out as in Example 1. The conditions in the crude separation, step 1, were as follows:

Feed: 2510 l beet molasses. The concentration of the feed was 39.9 g solids/100 g
Flow Rate: 5.49 m³/h
Resin: Duolite C 20 Na-form, 6.5% DVB
Bed Height: 6.1 m
Particle Size: 0.45 mm
Bed Diameter: 276 cm
Time Between Feeds: 105 minutes

| Composition of Feed | % on Dry Substance |
| --- | --- |
| Monosaccharides | 0.3 |
| Disaccharides | 62.4 |
| Betaine | 10.6 |
| Others | 26.7 |

Several successive feeds were carried out, with elution with water between feeds. The time between feeds, 105 minutes, was arranged so that the betaine fraction is eluted from the column during the early stages of the next successive feed. Thus, the betaine fraction, normally collected as the last fraction, is collected as the first fraction of the next successive series of collected fractions. All feeds were similar and the conditions during successive runs were kept unchanged.

Figure 8:
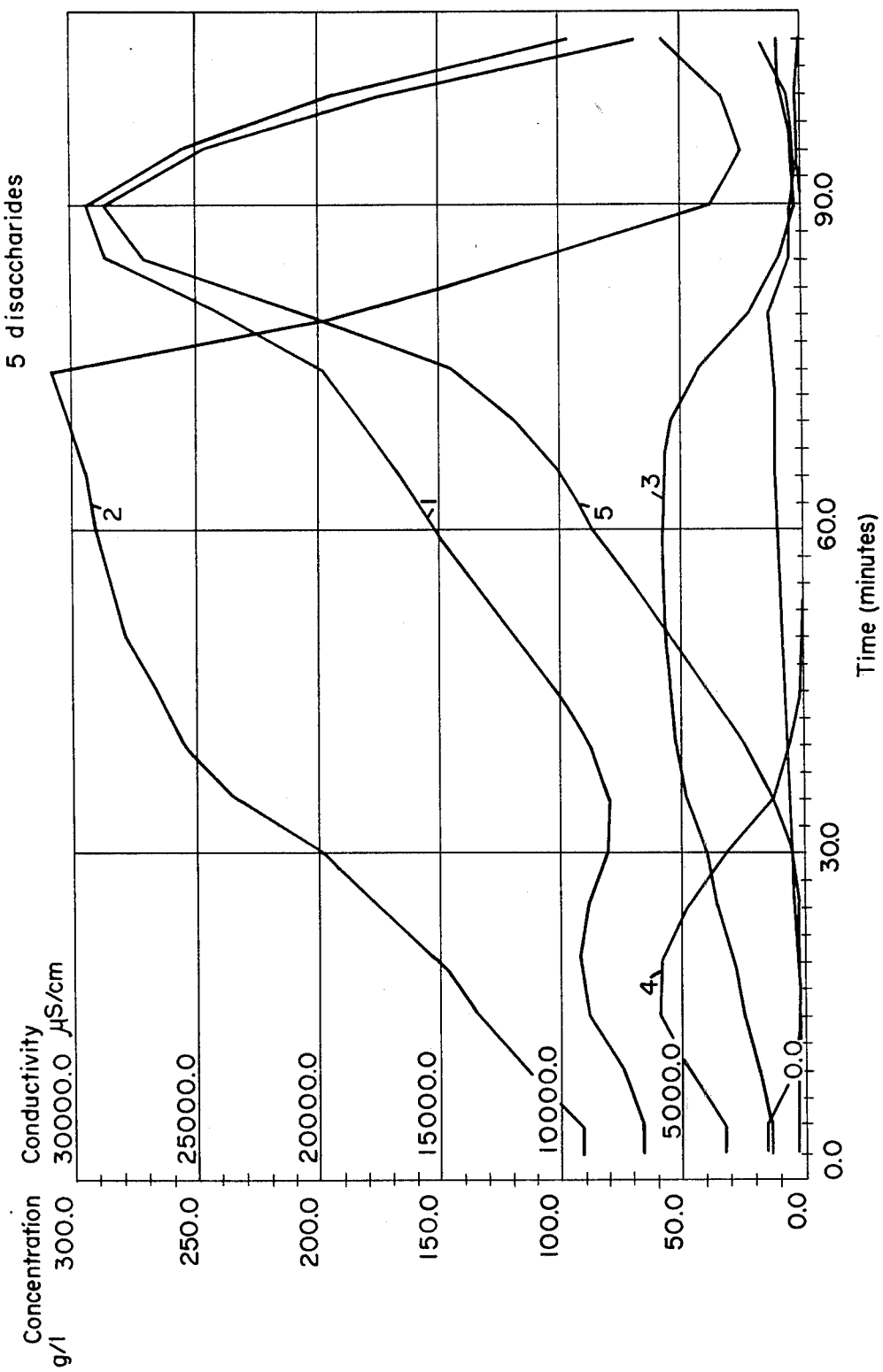

The result of the crude separation, Separation 1 of FIG. 7, is shown in FIG. 8. The eluate was collected as six fractions, the composition of which is shown in the following Table 5:

TABLE 5
COMPOSITION OF FRACTIONS FROM SEPARATION I, EXAMPLE 7

| | Fraction | | | | | |
| --- | --- | --- | --- | --- | --- | --- |
| | 1 | 2 | 3 | 4 | 5 | 6 |
| Minutes | 0–25 | 25–35 | –52.5 | –74.5 | –102.5 | –105 |
| Total Solids Concentration g/100 g | 7.8 | 7.8 | 9.9 | 15.6 | 22.2 | 9.4 |
| Composition of the Fractions % on Dry Substance | | | | | | |
| Monosaccharides | 1.9 | 00 | 00 | 00 | 00 | 00 |
| Disaccharides | 7.3 | 8.9 | 37.4 | 61.5 | 92.0 | 70.3 |
| Betaine | 59.6 | 32.6 | 2.8 | 00 | 1.0 | 17.7 |
| Others | 31.2 | 58.5 | 59.8 | 38.5 | 7.0 | 12.0 |

The feed capacity was 21.9 kg ds/h/m³. After the several separations were carried out, the betaine-rich fractions (Fraction 1) were combined to form the feed solution of the second fractionation, Separation 2 of FIG. 7. Fractions 2, 4 and 6 were recirculated. The combined solution was evaporated to 39.7% concentration. A concentration range of about 35–40% solids may be used. Fraction 3 was discarded as waste, while Fraction 5 was recovered as the sugar fraction.

Figure 9:
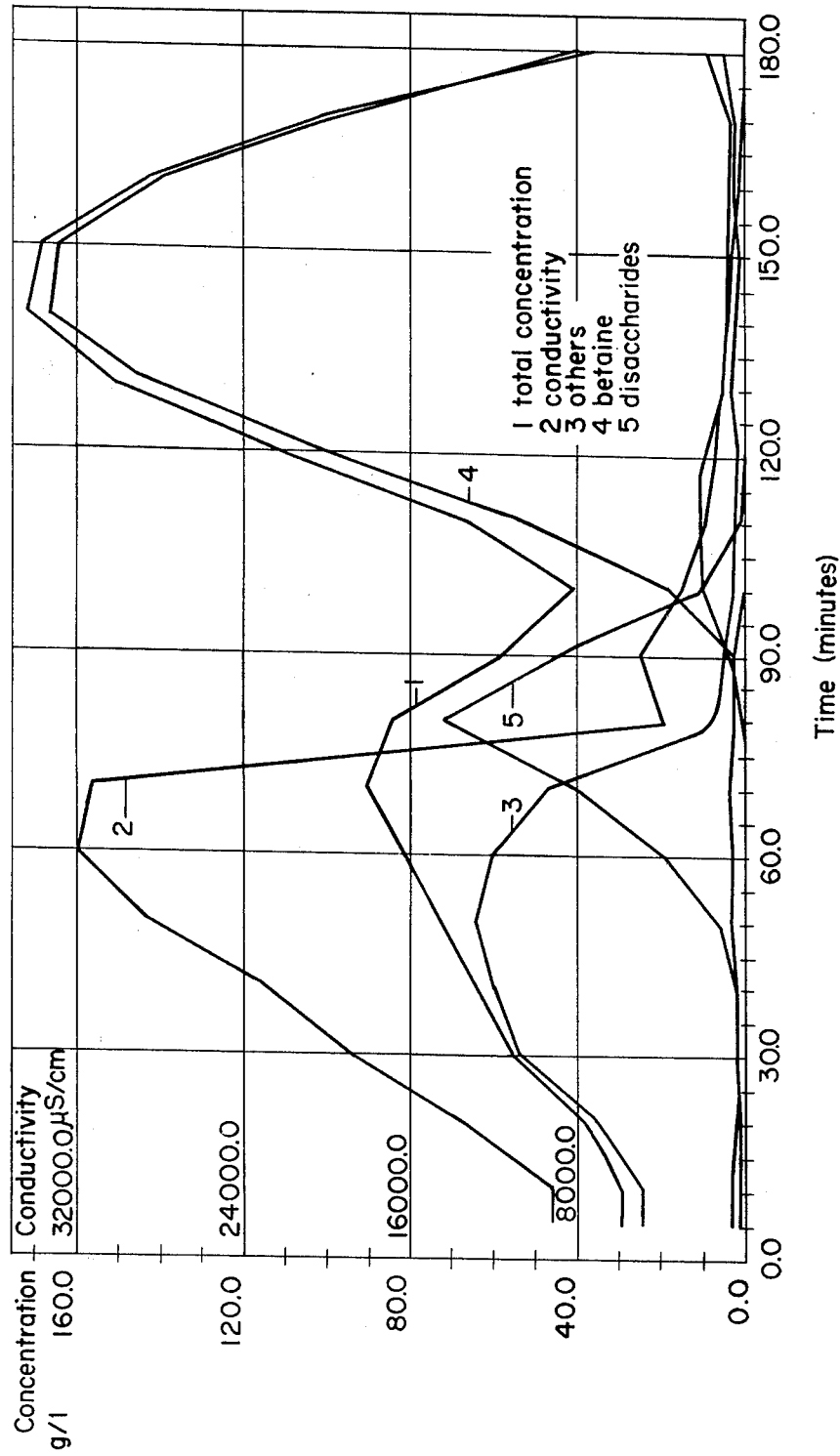

The conditions in the second fractionation, Separation 2 of FIG. 7, were:

Feed: 3000 l concentration 39.7 g/100 g
Flow Rate: 5.4 m³/h
Resin: Duolite C 20, Na-form, 6.5% DVB
Bed Height: 6.2 m
Particle Size: 0.45 mm
Bed Diameter: 276 cm
Time Between Feeds: 180 minutes The result of the fractionation is shown in FIG. 9. Four fractions were taken as shown in the following Table 6.

TABLE 6
COMPOSITION OF FRACTIONS FROM SEPARATION 2, EXAMPLE 7

| | Fraction | | | |
| --- | --- | --- | --- | --- |
| | 1 | 2 | 3 | 4 |
| Minutes | 0–95 | 95–105 | –179 | –180 |
| Total Solids Concentration g/100 g | 6.1 | 4.6 | 11.9 | 3.9 |
| Composition of the Fractions % on Dry Substance | | | | |
| Monosaccharides | 1.1 | 20.6 | 3.2 | 00 |
| Disaccharides | 32.0 | 17.1 | 0.1 | 00 |
| Betaine | 2.5 | 57.4 | 94.9 | 87.0 |
| Others | 64.4 | 4.9 | 1.8 | 13.0 |

The feed capacity was 12.5 kg ds/h/m³. The betaine fraction (Fraction 3) contained nearly 95% of ds betaine. Betaine was recovered from the betaine fraction, Fraction 3, by crystallization as described below in Example 8. Fraction 1 was discarded, and Fractions 2 and 4 were returned to the system in the next batch. The final run off from the crystallizations was also returned to the feed to the second separation step (FIG. 7).

EXAMPLE 8

Crystallization of betaine monohydrate

Beet molasses was separated by large scale chromatography in two steps as described in Example 7. In the two step fractionation process, the betaine yield is 86% and the purity of the betaine solution 90%. The dilute betaine solution was evaporated to 76 weight percent concentration. The concentrated solution was seeded with betaine monohydrate crystals, and betaine monohydrate was crystallized at 80°–85° C. under a vacuum of 130–180 millibar. The yield of betaine crystals was 55% (dry basis) and the purity of the crystals was 99.5%. The crystallization time was 4 hours. The crystals were separated from the mother liquor by centrifugation in a conventional sugar centrifuge. From the run off syrup anhydrous betaine was crystallized as in Example 2. The final run off syrup was recirculated to the separation as shown in the scheme of FIG. 7. The total betaine yield was 84.7%.

EXAMPLE 9

Crystallization of anhydrous betaine

A betaine solution of 90% purity was prepared as in Example 7. The solution was evaporated to 79% concentration and seeded with anhydrous betaine crystals. Anhydrous betaine was crystallized at 90°–95° C. under a vacuum of 170–200 millibar. The yield was 55% and the purity of the crystals 99%. The crystallization time was six hours. The run off syrups were treated as in Example 8.

EXAMPLE 10

Recovery of betaine from inverted beet molasses

This example describes a procedure where betaine was recovered by chromatographic separation from an inverted beet molasses as a betaine-rich fraction, and in a second stage, the betaine-rich fraction is further purified on an ion-exchange column. The invert sugar fraction from the ion-exchange column is combined with the sugar fraction from the chromatographic column. The betaine is eluted from the ion-exchange column by diluted ammonia or other suitable eluent. Betaine is crystallized as anhydrous betaine or as betaine hydrochloride from the neutralized solution.

Figure 10:
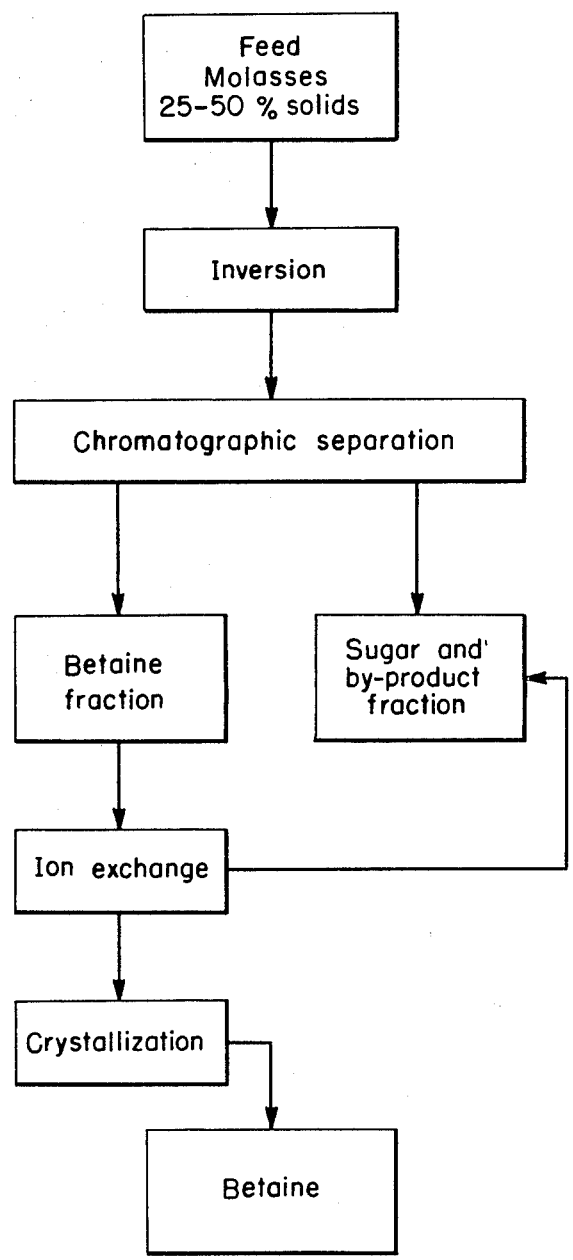

A flow chart of the process of this example is shown in FIG. 10, and the separation achieved on the chromatographic column in this example is shown in FIG. 11.

In the chromatographic separation of inverted molasses, the following materials and conditions were employed:

Resin Column: Sulphonated polystyrene-divinylbenzene cation exchange resin in $Na^+$-form. Mean bead diameter of 0.42 mm. Bed height 5.2 m, diameter of column 0.225 m. The resin was totally immersed in water.
Eluent: Water
Flow Rate: 0.880 $m^3/h/m^2$
Temperature: 78° C.
Feed Solution: Enzymically inverted beet molasses. Total amount 13.2 kg dry substance as a 35.5, weight % solution.

| Composition of Feed | % on Dry Substance |
|---|---|
| Monosaccharides (invert sugar) | 70 |
| Di- and Higher Saccharides | 3.6 |
| Betaine | 5.7 |
| Others | 20.7 |

The chromatographic separation was carried out as described above. From the effluent 5 fractions were collected. The analysis is shown in Table 7 and the separation is presented graphically in FIG. 11.

Referring to Table 7, Fraction 1 is a waste fraction, Fractions 2 and 5 are recycled and Fractions 3 and 4 collected as product fractions. Fraction 4, the betaine fraction, contains 85 % of the betaine present in the feed.

In a second stage, and in accordance with prior art separation techniques, the betaine fraction is fed to an ion-exchange column, which absorbs the betaine, while the sugars are not absorbed. The eluted sugar solution is combined with the sugar product fraction (Fraction 3) from the chromatographic separation. The ion-exchanger is then eluted with diluted ammonia solution to recover the absorbed betaine. From the eluted solution betaine is crystallized as anhydrous betaine as described above.

TABLE 7
CHROMATOGRAPHIC SEPARATION OF INVERTED MOLASSES. COMPOSITION OF FRACTIONS.

| | Fraction | | | | |
|---|---|---|---|---|---|
| | 1 | 2 | 3 | 4 | 5 |
| Time (minutes) | 0–65 | –75 | –105 | –145 | –155 |

TABLE 7-continued
CHROMATOGRAPHIC SEPARATION OF INVERTED MOLASSES. COMPOSITION OF FRACTIONS.

| | Fraction | | | | |
|---|---|---|---|---|---|
| | 1 | 2 | 3 | 4 | 5 |
| Total Solids kg | 2.7 | 1.0 | 4.8 | 4.5 | 0.1 |
| Concentration g/100 g | 7.4 | 16.2 | 25.0 | 18.0 | 2.3 |
| Composition of Fractions in % on Dry Substance | | | | | |
| Monosaccharides (invert sugar) | 12.1 | 58.4 | 92.3 | 85.0 | 5.2 |
| Di- and Higher Saccharides | 10.5 | 8.0 | 2.5 | 0.0 | 0.0 |
| Betaine | 0.0 | 0.0 | 1.1 | 14.1 | 40.4 |
| Others | 77.4 | 33.6 | 4.1 | 0.9 | 54.4 |

Fraction 4 is the betaine fraction and Fraction 3 the invert sugar fraction. The betaine fraction contains 14.1% betaine and 85% invert sugar but only traces of other substances. When the betaine-rich fraction is subjected to ion-exchange treatment, a purified betaine is recovered.

We claim:

1. A process for recovering betaine from molasses which comprises:
   (a) diluting the molasses to provide a diluted molasses having a solids content within the approximate range of 25–50%,
   (b) providing a chromatographic column of a salt of a polystyrene sulfonate cation exchange resin cross-coupled with from about 2 to about 12 weight percent of divinylbenzene, the resin being of uniform particle size and having a mean particle size within the range of about 20 to 400 U.S. mesh,
   (c) submerging the column of resin in water,
   (d) introducing the diluted molasses in uniform supply to the resin surface at the top of the column,
   (e) eluting the molasses from the column with water to provide an eluate, and
   (f) recovering from the downstream side of the resin bed a fraction which consists principally of betaine.

2. The process of claim 1 wherein the fraction consisting principally of betaine is concentrated by evaporation to a solids content of about 80% by weight, the concentrated solution is seeded with betaine crystals, the solution is subjected to crystallization procedures at 75°–95° C. with the application of vacuum, and the anhydrous betaine crystals thus obtained are separated from the solution, leaving a run off syrup.

3. The process of claim 2 wherein the run off syrup from the crystallization process is recycled to the diluted molasses feed solution.

4. The process of claim 2 wherein the anhydrous betaine crystals obtained by the crystallization process are dissolved in water to form a solution having about 60% solids, the solution is subjected to a color removal step provided by activated carbon treatment and filtration, and the betaine is recrystallized as monohydrate crystals from the solution at 80° C. to recover crystals having a purity of nearly 100% betaine.

5. A process for recovering betaine from molasses which comprises:
   (a) diluting the molasses to provide a diluted molasses having a solids content within the approximate range of 25–50%,
   (b) providing a column of a salt of a polystyrene sulfonate cation exchange resin cross-coupled with from about 2 to about 12 weight percent of divinylbenzene, the resin being of uniform particle size and having a mean particle size within the range of about 20 to 400 U.S. mesh, (c) submerging the column of resin in water, (d) introducing the diluted molasses to the column in uniform supply to the resin surface at the top of the column at a flow rate of 0.5 to 2.0 cubic meters per hour per square meters of the cross-section of the resin column, (e) eluting the molasses from the column with water to provide an eluate, and (f) recovering from the downstream side of the resin bed
  (1) a first waste fraction,
  (2) a second fraction containing a substantial proportion of the sugars of the feed solution, and
  (3) a third fraction consisting principally of betaine.

6. The process of claim 5 wherein the third fraction consisting principally of betaine is concentrated by evaporation to a solids content within the range of about 77 to 81% by weight, the concentrated solution is seeded with betaine crystals, the solution is subjected to crystallization procedures at 75°–85° C. with the application of vacuum, and the anhydrous betaine crystals thus obtained are separated from the solution leaving a run off syrup.

7. The process of claim 6 wherein the run off syrup from the crystallization process is recycled to the diluted molasses feed solution.

8. The process of claim 6 wherein the anhydrous betaine crystals obtained by the crystallization process are dissolved in water, the solution subjected to a color removal step provided by activated carbon treatment and filtration, and the betaine is recrystallized as monohydrate crystals from the solution at about 80° C. to recover crystals having a purity of nearly 100% betaine.

9. The process of claim 1 wherein the fraction which consists principally of betaine is concentrated to about 35–40% solids to form a concentrated crude betaine feed solution, the concentrated feed solution is introduced in uniform supply to a water-submerged chromatographic column as described in claim 1, and there is recovered from the downstream side of the column, a waste fraction and a betaine fraction of purity substantially higher than that of the concentrated feed solution.

10. The process of claim 9 wherein the fractions are selected to include fractions or lesser purity for recycling.

11. The process of claim 9 wherein the recovered betaine fraction is concentrated by evaporation to a solids content within the range of about 77 to 81% by weight, the concentrated solution is seeded with betaine crystals, the solution is subjected to crystallization procedures at 85°–95° C. with the application of vacuum, and the anhydrous betaine crystals thus obtained are separated from the solution leaving a run off syrup.

12. The process of claim 5, wherein the molasses in step (a) is an invert molasses.

13. A process for recovering betaine from invert molasses which comprises:

(a) diluting the molasses to provide a diluted molasses having a solids content within the approximate range of 25–50%, (b) providing a column of a salt of a polystyrene sulfonate cation exchange resin cross-coupled with from about 2 to about 12 weight percent of divinylbenzene, the resin being of uniform particle size and having a mean particle size within the range of about 20 to 400 U.S. mesh, (c) submerging the column of resin in water, (d) introducing the diluted molasses to the column in uniform supply to the resin surface at the top of the column at a flow rate of 0.5 to 2.0 cubic meters per hour per square meters of the cross-section of the resin column, (e) eluting the molasses from the column with water to provide an eluate, and (f) recovering from the downstream side of the resin bed
  (1) a first waste fraction,
  (2) a second fraction containing a substantial proportion of the sugars of the feed solution, and
  (3) a third fraction consisting principally of betaine and invert sugars.

14. The process of claim 13, wherein fraction (f) (3) consisting principally of betaine and invert sugars is passed through an ion-exchange column to adsorb the betaine, the invert sugars are collected and combined with fraction (f) (2), and the betaine is eluted therefrom.

15. The process of claim 13, wherein the molasses is diluted to about 35% by weight.

* * * * *